United States Patent
Oh et al.

(10) Patent No.: US 11,479,567 B2
(45) Date of Patent: Oct. 25, 2022

(54) COMPOUND AND COLOR CONVERSION FILM COMPRISING SAME, BACKLIGHT UNIT, AND DISPLAY DEVICE

(71) Applicant: LG CHEM, LTD., Seoul (KR)

(72) Inventors: Hye Mi Oh, Daejeon (KR); Dong Mok Shin, Daejeon (KR); Nari Kim, Daejeon (KR); Ji Ho Kim, Daejeon (KR); Sung Yong Min, Daejeon (KR)

(73) Assignee: LG CHEM, LTD., Seoul (KR)

( * ) Notice: Subject to any disclaimer, the term of this patent is extended or adjusted under 35 U.S.C. 154(b) by 401 days.

(21) Appl. No.: 16/652,250

(22) PCT Filed: Apr. 30, 2019

(86) PCT No.: PCT/KR2019/005172
§ 371 (c)(1),
(2) Date: Mar. 30, 2020

(87) PCT Pub. No.: WO2019/212219
PCT Pub. Date: Nov. 7, 2019

(65) Prior Publication Data
US 2020/0247826 A1    Aug. 6, 2020

(30) Foreign Application Priority Data

Apr. 30, 2018    (KR) .................. 10-2018-0049543

(51) Int. Cl.
| C07F 5/02 | (2006.01) |
| C08K 5/55 | (2006.01) |
| C09K 11/06 | (2006.01) |

(52) U.S. Cl.
CPC ............... *C07F 5/022* (2013.01); *C08K 5/55* (2013.01); *C09K 11/06* (2013.01); *C09K 2211/1018* (2013.01)

(58) Field of Classification Search
CPC .......... C07F 5/022; C08K 5/55; C09K 11/06; C09K 2211/1018
See application file for complete search history.

(56) References Cited

U.S. PATENT DOCUMENTS

| 2018/0208838 A1 | 7/2018 | Sakaino et al. |
| 2019/0263836 A1 | 8/2019 | Oh et al. |
| 2020/0199158 A1 | 6/2020 | Oh et al. |

FOREIGN PATENT DOCUMENTS

| CN | 106478702 A | 3/2017 |
| JP | 2010-061824 A | 3/2010 |
| JP | 2011-241160 A | 12/2011 |
| JP | 2011241160 A | 12/2011 |
| KR | 2017-0037500 A | 4/2017 |
| KR | 2018-0013798 A | 2/2018 |
| KR | 2018-0026340 A | 3/2018 |
| WO | 2017-061337 A1 | 4/2017 |

OTHER PUBLICATIONS

Search Report and Written Opinion issued for International Application No. PCT/KR2019/005172 dated Aug. 14, 2019, 6 pages.
Zhao, N, et, al. "Enhanced Hypsochromic Shifts, Quantum Yield, and Π-Π Interactions in a meso, β-Heteroaryl-Fused BODIPY", Journal of Organic Chmistry, 2017.vol. 82, No. 7, pp. 3880-3885.
Verbelen, B. et, al. "Radical C—H Alkylation of BODIPY Dyes Using Potassium Trifluoroborates or Boronic Acids", Chem. Eur. J., 2015, vol. 21, pp. 12667-12675.
Wu, Y. et, al. "N-Bridged Annulated BODIPYs: Synthesis of Highly Fluorescent Blueshifted Dyes", Chemistry—An Asian Journal, 2017, vol. 12, No. 17, pp. 2216-2220.

*Primary Examiner* — Alicia L Otton
(74) *Attorney, Agent, or Firm* — Rothwell, Figg, Ernst & Manbeck, P.C.

(57) ABSTRACT

The present specification relates to a compound, and a color conversion film, a backlight unit and a display apparatus including the same.

16 Claims, 1 Drawing Sheet

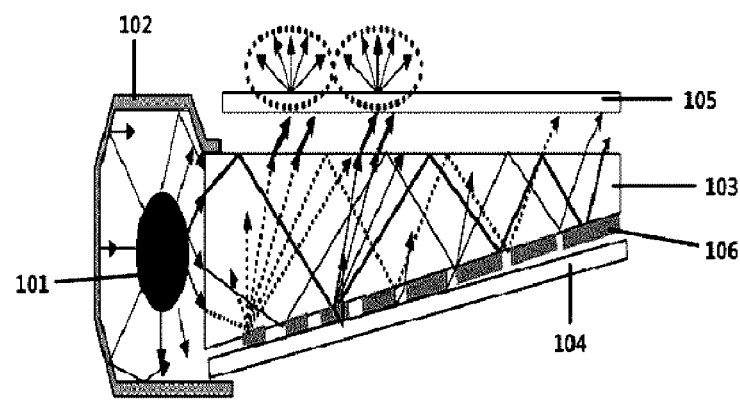

COMPOUND AND COLOR CONVERSION FILM COMPRISING SAME, BACKLIGHT UNIT, AND DISPLAY DEVICE

CROSS-REFERENCE TO THE RELATED APPLICATIONS

The application is a 35 U.S.C. § 371 National Phase Entry Application from PCT/KR2019/005172, filed on Apr. 30, 2019, and designating the United States, which claims priority to and the benefits of Korean Patent Application No. 10-2018-0049543, filed with the Korean Intellectual Property Office on Apr. 30, 2018, the entire contents of which are incorporated herein by reference.

TECHNICAL FIELD

The present disclosure relates to a compound for a conversion film, and a color conversion film, a backlight unit and a display apparatus including the same.

BACKGROUND OF THE INVENTION

Existing light emitting diodes (LED) are obtained by mixing a green phosphorescent substance and a red phosphorescent substance to a blue light emitting diode, or mixing a yellow phosphorescent substance and a blue-green phosphorescent substance to a UV light emitting diode. However, with such a method, it is difficult to control colors, and therefore, color rendering is not favorable. Accordingly, color gamut declines.

In order to overcome such color gamut decline and reduce production costs, methods of obtaining green and red in a manner of filming quantum dots and binding the dots to a blue LED have been recently tried. However, cadmium series quantum dots have safety problems, and other quantum dots have significantly decreased efficiency compared to cadmium series quantum dots. In addition, quantum dots have reduced stability for oxygen and water, and have a disadvantage in that the performance is significantly degraded when aggregated. Furthermore, unit costs of production are high since, when producing quantum dots, maintaining the sizes is difficult.

BRIEF SUMMARY OF THE INVENTION

The present specification provides a compound for a conversion film, and a color conversion film, a backlight unit and a display apparatus including the same.

Technical Solution

One embodiment of the present specification provides a compound represented by the following Chemical Formula 1.

[Chemical Formula 1]

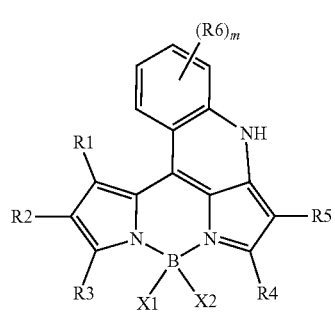

In Chemical Formula 1,

R1, R2, R5 and R6 are the same as or different from each other, and each independently hydrogen; deuterium; a cyano group; a nitro group; an imide group; an amide group; a carbonyl group; an ester group; a substituted or unsubstituted fluoroalkyl group; a substituted or unsubstituted sulfonyl group; a substituted or unsubstituted sulfonamide group; a substituted or unsubstituted alkyl group; a substituted or unsubstituted cycloalkyl group; a substituted or unsubstituted alkoxy group; a substituted or unsubstituted aryloxy group; a substituted or unsubstituted aryl group; or a substituted or unsubstituted heteroaryl group, m is an integer of 0 to 4, and when m is 2 or greater, R6s are the same as or different from each other, R3 and R4 are the same as or different from each other, and each independently a substituted or unsubstituted cycloalkyl group; or a substituted or unsubstituted aryloxy group, and X1 and X2 are the same as or different from each other, and each independently a halogen group; a cyano group; a nitro group; an imide group; an amide group; a carbonyl group; an ester group; a substituted or unsubstituted fluoroalkyl group; a substituted or unsubstituted sulfonyl group; a substituted or unsubstituted sulfonamide group; a substituted or unsubstituted alkoxy group; a substituted or unsubstituted aryloxy group; or a substituted or unsubstituted aryl group, or X1 and X2 bond to each other to form a substituted or unsubstituted ring.

Another embodiment of the present specification provides a color conversion film including a resin matrix; and the compound represented by Chemical Formula 1 dispersed into the resin matrix.

Another embodiment of the present specification provides a backlight unit including the color conversion film.

Another embodiment of the present specification provides a display apparatus including the backlight unit.

Advantageous Effects

A compound according to one embodiment of the present specification exhibits green and red light emission having excellent light resistance when a substituent having a bulky structure such as a cycloalkyl group bonds to R3 and R4 of a structure of Chemical Formula 1. Accordingly, by using the compound described in the present specification as a fluorescent substance of a color conversion film, a color conversion film having excellent luminance and color gamut, and having excellent light resistance can be provided.

Particularly, when R3 and R4 are a cycloalkyl group; or an aryloxy group, light emission may occur in a shorter wavelength region compared to when R3 and R4 are hydrogen or an aryl group, and an effect of enhancing durability in a color conversion film is obtained.

DESCRIPTION OF DRAWINGS

FIG. 1 is a mimetic diagram using a color conversion film according to one embodiment of the present specification in a backlight.

REFERENCE NUMERAL

101: Side Chain-Type Light Source
102: Reflecting Plate
103: Light Guide Plate
104: Reflective Layer
105: Color Conversion Film
106: Light Dispersion Pattern

MODE FOR DISCLOSURE

Hereinafter, the present specification will be described in more detail.

One embodiment of the present specification provides a compound represented by Chemical Formula 1.

According to one embodiment of the present specification, when R3 and R4 are a cycloalkyl group; or an aryloxy group, a property of emitting light in a shorter wavelength region is obtained compared to when R3 and R4 are hydrogen or an aryl group, and therefore, durability is enhanced in a color conversion film.

In the present specification, a certain part "including" certain constituents means capable of further including other constituents, and does not exclude other constituents unless particularly stated on the contrary.

In the present specification, one member being placed "on" another member includes not only a case of the one member adjoining the another member but a case of still another member being present between the two members.

Examples of substituents in the present specification are described below, however, the substituents are not limited thereto.

The term "substitution" means a hydrogen atom bonding to a carbon atom of a compound is changed to another substituent, and the position of substitution is not limited as long as it is a position at which the hydrogen atom is substituted, that is, a position at which a substituent can substitute, and when two or more substituents substitute, the two or more substituents may be the same as or different from each other.

The term "substituted or unsubstituted" in the present specification means being substituted with one, two or more substituents selected from the group consisting of deuterium; a halogen group; a cyano group; a nitro group; a carbonyl group; a carboxyl group (—COOH); an ether group; an ester group; a hydroxyl group; a substituted or unsubstituted alkyl group; a substituted or unsubstituted cycloalkyl group; a substituted or unsubstituted alkoxy group; a substituted or unsubstituted aryloxy group; a substituted or unsubstituted aryl group; and a substituted or unsubstituted heterocyclic group, or being substituted with a substituent linking two or more substituents among the substituents illustrated above, or having no substituents. For example, "a substituent linking two or more substituents" may include a biphenyl group. In other words, a biphenyl group may be an aryl group, or interpreted as a substituent linking two phenyl groups.

In the present specification,

means a site bonding to other substituents or bonding sites.

In the present specification, the halogen group may be fluorine, chlorine, bromine or iodine.

In the present specification, the imide group is —C(=O)NR$_{100}$R$_{101}$, and R$_{100}$ and R$_{101}$ are the same as or different from each other and may be each independently selected from the group consisting of a halogen group; a nitrile group; a substituted or unsubstituted monocyclic or polycyclic cycloalkyl group having 3 to 30 carbon atoms; a substituted or unsubstituted linear or branched alkyl group having 1 to 30 carbon atoms; a substituted or unsubstituted monocyclic or polycyclic aryl group having 6 to 30 carbon atoms; and a substituted or unsubstituted monocyclic or polycyclic heteroaryl group having 2 to 30 carbon atoms. In the present specification, the amide group is —C(=O)NHR$_{102}$, and R$_{102}$ may be selected from the group consisting of hydrogen; deuterium; a halogen group; a nitrile group; a substituted or unsubstituted monocyclic or polycyclic cycloalkyl group having 3 to 30 carbon atoms; a substituted or unsubstituted linear or branched alkyl group having 1 to 30 carbon atoms; a substituted or unsubstituted monocyclic or polycyclic aryl group having 6 to 30 carbon atoms; and a substituted or unsubstituted monocyclic or polycyclic heteroaryl group having 2 to 30 carbon atoms.

In the present specification, the carbonyl group is —C(=O)R$_{103}$, and R$_{103}$ may be selected from the group consisting of hydrogen; deuterium; a halogen group; a nitrile group; a substituted or unsubstituted monocyclic or polycyclic cycloalkyl group having 3 to 30 carbon atoms; a substituted or unsubstituted linear or branched alkyl group having 1 to 30 carbon atoms; a substituted or unsubstituted monocyclic or polycyclic aryl group having 6 to 30 carbon atoms; and a substituted or unsubstituted monocyclic or polycyclic heteroaryl group having 2 to 30 carbon atoms.

In the present specification, in the ether group, the oxygen of the ether group may be substituted with a linear, branched or cyclic alkyl group having 1 to 25 carbon atoms; or a monocyclic or polycyclic aryl group having 6 to 30 carbon atoms.

In the present specification, the ester group is —C(=O)OR$_{104}$ and —OC(=O)R$_{105}$, and R$_{104}$ or R$_{105}$ are the same as or different from each other and may be each independently selected from the group consisting of a halogen group; a nitrile group; a substituted or unsubstituted monocyclic or polycyclic cycloalkyl group having 3 to 30 carbon atoms; a substituted or unsubstituted linear or branched alkyl group having 1 to 30 carbon atoms; a substituted or unsubstituted linear or branched fluoroalkyl group having 1 to 20 carbon atoms; a substituted or unsubstituted monocyclic or polycyclic aryl group having 6 to 30 carbon atoms; and a substituted or unsubstituted monocyclic or polycyclic heteroaryl group having 2 to 30 carbon atoms.

In the present specification, the fluoroalkyl group may be linear or branched, and although not particularly limited thereto, the number of carbon atoms is preferably from 1 to 30. Specific examples thereof may include a trifluoromethyl group, a perfluoroethyl group and the like, but are not limited thereto.

In the present specification, the sulfonyl group may be —SO$_2$R$_{106}$, and R$_{106}$ may be selected from the group consisting of hydrogen; deuterium; a halogen group; a nitrile group; a substituted or unsubstituted monocyclic or polycyclic cycloalkyl group having 3 to 30 carbon atoms; a substituted or unsubstituted linear or branched alkyl group having 1 to 30 carbon atoms; a substituted or unsubstituted monocyclic or polycyclic aryl group having 6 to 30 carbon atoms; and a substituted or unsubstituted monocyclic or polycyclic heteroaryl group having 2 to 30 carbon atoms.

In the present specification, the sulfonamide group may be —SO$_2$NR$_{107}$R$_{108}$ and —NR$_{107}$SO$_2$R$_{108}$, and R$_{107}$ or R$_{108}$ are the same as or different from each other and may be each independently selected from the group consisting of hydrogen; deuterium; a halogen group; a nitrile group; a substituted or unsubstituted monocyclic or polycyclic cycloalkyl group having 3 to 30 carbon atoms; a substituted or unsubstituted linear or branched alkyl group having 1 to 30 carbon atoms; a substituted or unsubstituted monocyclic or polycyclic aryl group having 6 to 30 carbon atoms; and a substituted or unsubstituted monocyclic or polycyclic heteroaryl group having 2 to 30 carbon atoms.

In the present specification, the alkyl group may be linear or branched, and although not particularly limited thereto, the number of carbon atoms is preferably from 1 to 30. Specific examples thereof may include methyl, ethyl, propyl, n-propyl, isopropyl, butyl, n-butyl, isobutyl, tert-butyl, sec-butyl, 1-methyl-butyl, 1-ethylbutyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl and the like, but are not limited thereto.

In the present specification, the cycloalkyl group is not particularly limited, but preferably has 3 to 30 carbon atoms, and specific examples thereof may include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl and the like, but are not limited thereto.

In the present specification, the alkoxy group may be linear, branched or cyclic. The number of carbon atoms of the alkoxy group is not particularly limited, but is preferably from 1 to 30. Specific examples thereof may include methoxy, ethoxy, n-propoxy, isopropoxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy and the like, but are not limited thereto.

In the present specification, the aryl group is not particularly limited, but preferably has 6 to 30 carbon atoms, and the aryl group may be monocyclic or polycyclic.

When the aryl group is a monocyclic aryl group, the number of carbon atoms is not particularly limited, but is preferably from 6 to 30. Specific examples of the monocyclic aryl group may include a phenyl group, a biphenyl group, a terphenyl group and the like, but are not limited thereto.

When the aryl group is a polycyclic aryl group, the number of carbon atoms is not particularly limited, but is preferably from 10 to 30. Specific examples of the polycyclic aryl group may include a naphthyl group, an anthracenyl group, a phenanthryl group, a triphenyl group, a pyrenyl group, a perylenyl group, a chrysenyl group, a fluorenyl group and the like, but are not limited thereto.

In the present specification, the fluorenyl group may be substituted, and adjacent substituents may bond to each other to form a ring.

When the fluorenyl group is substituted,

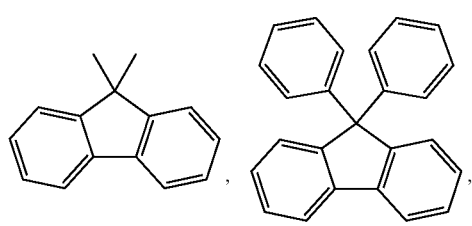

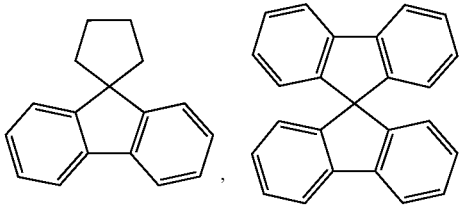

and the like may be included. However, the structure is not limited thereto.

In the present specification, the aryl group in the aryloxy group is the same as the examples of the aryl group described above. Specific examples of the aryloxy group may include a phenoxy group, a p-tolyloxy group, an m-tolyloxy group, a 3,5-dimethyl-phenoxy group, a 2,4,6-trimethylphenoxy group, a p-tert-butylphenoxy group, a 3-biphenyloxy group, a 4-biphenyloxy group, a 1-naphthyloxy group, a 2-naphthyloxy group, a 4-methyl-1-naphthyloxy group, a 5-methyl-2-naphthyloxy group, a 1-anthryloxy group, a 2-anthryloxy group, a 9-anthryloxy group, a 1-phenanthryloxy group, a 3-phenanthryloxy group, a 9-phenanthryloxy group and the like, and specific examples of the arylthioxy group may include a phenylthioxy group, a 2-methylphenylthioxy group, a 4-tert-butylphenylthioxy group and the like, and specific examples of the arylsulfoxy group may include a benzenesulfoxy group, a p-toluenesulfoxy group and the like, however, the examples are not limited thereto.

In the present specification, the heteroaryl group is a group including one or more atoms that are not carbon, that is, heteroatoms, and specifically, the heteroatom may include one or more atoms selected from the group consisting of O, N, Se, S and the like. The number of carbon atoms is not particularly limited, but is preferably from 2 to 30, and the heteroaryl group may be monocyclic or polycyclic. Examples of the heterocyclic group may include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group, an isoxazolyl group, a thiadiazolyl group, a phenothiazinyl group, a dibenzofuranyl group and the like, but are not limited thereto.

In the present specification, the heterocyclic group may be monocyclic or polycyclic, may be aromatic, aliphatic or a fused ring of aromatic and aliphatic, and may be selected from among the examples of the heteroaryl group.

In one embodiment of the present specification, R3 and R4 are the same as or different from each other, and each independently a substituted or unsubstituted cyclohexyl group; a substituted or unsubstituted cyclopentyl group; a substituted or unsubstituted cycloheptyl group; a substituted or unsubstituted cyclooctyl group; or a substituted or unsubstituted phenoxy group.

In one embodiment of the present specification, R3 and R4 are the same as or different from each other, and each independently a substituted or unsubstituted cyclohexyl group; or a substituted or unsubstituted phenoxy group.

In one embodiment of the present specification, R3 and R4 are the same as or different from each other, and each independently a cyclohexyl group unsubstituted or substituted with an alkyl group, a cyano group, a fluoroalkyl group, an alkoxy group or an aryl group; or a phenoxy group unsubstituted or substituted with an alkyl group, a cyano group, a fluoroalkyl group, an alkoxy group or an aryl group.

In one embodiment of the present specification, R3 and R4 are the same as or different from each other, and each independently a cyclohexyl group unsubstituted or substituted with an alkyl group, an aryl group or an alkoxy group; or a phenoxy group unsubstituted or substituted with an alkyl group, a cyano group, a fluoroalkyl group or an aryl group.

In one embodiment of the present specification, R3 and R4 are the same as or different from each other, and each independently a cyclohexyl group unsubstituted or substituted with a methyl group, an ethyl group, a propyl group, a butyl group, a phenyl group, a naphthyl group or a methoxy group; or a phenoxy group unsubstituted or substituted with a methyl group, an ethyl group, a propyl group, a butyl group, a cyano group, a trifluoromethyl group or a phenyl group.

In one embodiment of the present specification, R3 and R4 are the same as or different from each other, and each independently a cyclohexyl group substituted with an aryl group.

In one embodiment of the present specification, R3 and R4 are the same as or different from each other, and each independently a cycloalkyl group substituted with an alkyl group or an aryl group.

In one embodiment of the present specification, R3 and R4 are a cycloalkyl group substituted with an aryl group. Compared to a compound in which R3 and R4 are a cycloalkyl group substituted with an alkyl group, a compound in which R3 and R4 are a cycloalkyl group substituted with an aryl group has an emission wavelength suitable to prepare a film emitting green light in a shorter wavelength region, and has excellent driving durability. In one embodiment of the present specification, R3 and R4 are the same as or different from each other, and each independently a cyclohexyl group substituted with a phenyl group.

In one embodiment of the present specification, R1 is hydrogen; deuterium; a substituted or unsubstituted alkyl group; a substituted or unsubstituted cycloalkyl group; a substituted or unsubstituted alkoxy group; a substituted or unsubstituted aryloxy group; a substituted or unsubstituted aryl group; or a substituted or unsubstituted heteroaryl group.

In one embodiment of the present specification, R1 is hydrogen; or a substituted or unsubstituted cycloalkyl group.

In one embodiment of the present specification, R1 is hydrogen; a substituted or unsubstituted cyclohexyl group; a substituted or unsubstituted cyclopentyl group; a substituted or unsubstituted cycloheptyl group; a substituted or unsubstituted cyclooctyl group; or a substituted or unsubstituted phenoxy group.

In one embodiment of the present specification, R1 is hydrogen; or a substituted or unsubstituted cyclohexyl group.

In one embodiment of the present specification, R1 is hydrogen; a cyclohexyl group substituted with an aryl group; or a substituted or unsubstituted phenoxy group.

In one embodiment of the present specification, R1 is hydrogen; a cyclohexyl group unsubstituted or substituted with an alkyl group, a cyano group, a fluoroalkyl group, an alkoxy group or an aryl group; or a phenoxy group unsubstituted or substituted with an alkyl group, a cyano group, a fluoroalkyl group, an alkoxy group or an aryl group.

In one embodiment of the present specification, R1 is hydrogen; a cyclohexyl group unsubstituted or substituted with an alkyl group, an aryl group or an alkoxy group; or a phenoxy group unsubstituted or substituted with an alkyl group, a cyano group, a fluoroalkyl group or an aryl group.

In one embodiment of the present specification, R1 is hydrogen; a cyclohexyl group unsubstituted or substituted with a methyl group, an ethyl group, a propyl group, a butyl group, a phenyl group, a naphthyl group or a methoxy group; or a phenoxy group unsubstituted or substituted with a methyl group, an ethyl group, a propyl group, a butyl group, a cyano group, a trifluoromethyl group or a phenyl group.

In one embodiment of the present specification, R1 is hydrogen; or a cyclohexyl group substituted with a phenyl group.

In one embodiment of the present specification, R2 and R5 are the same as or different from each other, and each independently hydrogen; deuterium; a cyano group; a nitro group; an imide group; an amide group; a carbonyl group; an ester group; a substituted or unsubstituted fluoroalkyl group; a substituted or unsubstituted sulfonyl group; a substituted or unsubstituted sulfonamide group; or a substituted or unsubstituted aryl group.

In one embodiment of the present specification, R2 and R5 are the same as or different from each other, and each independently hydrogen; a cyano group; an ester group; or an aryl group.

In one embodiment of the present specification, R2 and R5 are the same as or different from each other, and each independently hydrogen; a cyano group; —C(=O)OR$_{104}$; or an aryl group, and R$_{104}$ is a substituted or unsubstituted linear or branched fluoroalkyl group having 1 to 20 carbon atoms.

In one embodiment of the present specification, R$_{104}$ is a linear fluoroalkyl group having 1 to 5 carbon atoms.

In one embodiment of the present specification, R$_{104}$ is a trifluoromethyl group; a pentafluoroethyl group; or a heptafluoropropyl group.

In one embodiment of the present specification, R2 and R5 are the same as or different from each other, and each independently hydrogen; a cyano group; —C(=O)OR$_{104}$; or a phenyl group, and R$_{104}$ is a heptafluoropropyl group.

In one embodiment of the present specification, R6 is hydrogen.

In one embodiment of the present specification, X1 and X2 are the same as or different from each other, and each independently a halogen group, a cyano group, a substituted or unsubstituted alkoxy group, or a substituted or unsubstituted aryloxy group.

In one embodiment of the present specification, X1 and X2 are the same as or different from each other, and each independently a halogen group or a cyano group.

In one embodiment of the present specification, X1 and X2 are the same as or different from each other, and each independently a halogen group.

In one embodiment of the present specification, X1 and X2 are F.

According to one embodiment of the present specification, R1, R3 and R4 may be selected from the following Table 1, R2 and R5 may be selected from the following Table 2, R6 is hydrogen, and X1 and X2 may be selected from the following Table 3.

TABLE 1
| combination | R1 | R3 | R4 |
|---|---|---|---|
| 1A | 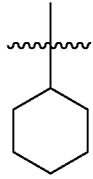 [SMILES: *C1CCCCC1] | 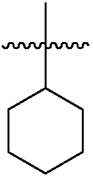 | 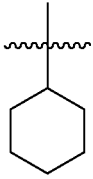 |
| 2A | 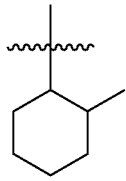 [SMILES: *C1CCCCC1C] | 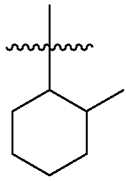 | 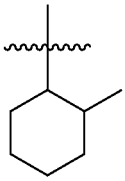 |
| 3A | 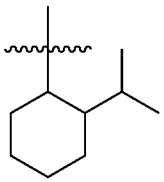 [SMILES: *C1CCCCC1C(C)C] | 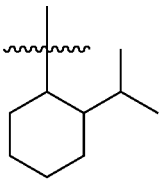 [SMILES: *C1CCCCC1C(C)C] | 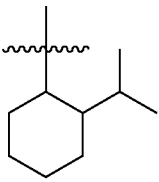 |
| 4A | 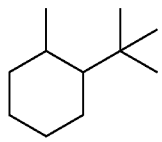 | 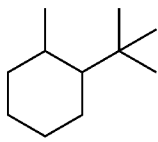 | 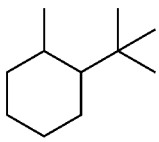 |
| 5A | 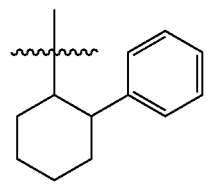 [SMILES: *C1CCCCC1c1ccccc1] | 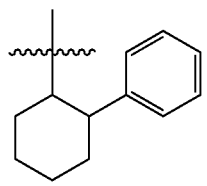 [SMILES: *C1CCCCC1c1ccccc1] | 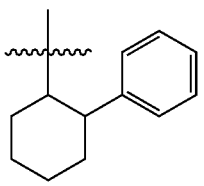 [SMILES: *C1CCCCC1c1ccccc1] |
| 6A | 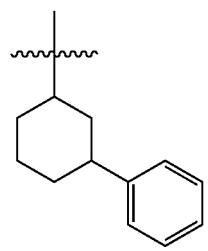 | 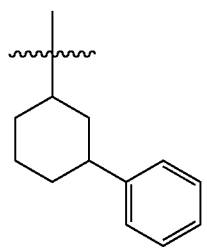 | 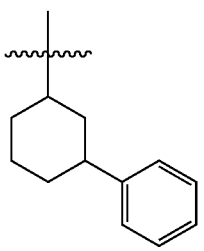 |
| 7A | 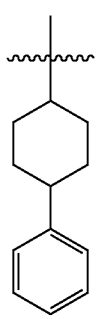 | 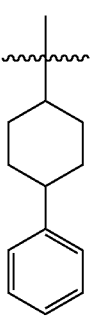 | 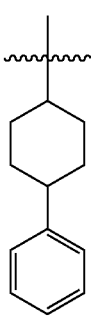 |

TABLE 1-continued

| combination | R1 | R3 | R4 |
|---|---|---|---|
| 8A | cyclopentyl | cyclopentyl | cyclopentyl |
| 9A | cycloheptyl | cycloheptyl | cycloheptyl |
| 10A | 2-ethylcyclohexyl | 2-ethylcyclohexyl | 2-ethylcyclohexyl |
| 11A | 2-methoxycyclohexyl | 2-methoxycyclohexyl | 2-methoxycyclohexyl |
| 12A | 2,6-dimethylcyclohexyl | 2,6-dimethylcyclohexyl | 2,6-dimethylcyclohexyl |
| 13A | 2,6-diisopropylcyclohexyl | 2,6-diisopropylcyclohexyl | 2,6-diisopropylcyclohexyl |
| 14A | 2,6-di-tert-butylcyclohexyl | 2,6-di-tert-butylcyclohexyl | 2,6-di-tert-butylcyclohexyl |
| 15A | 2,6-diphenylcyclohexyl | 2,6-diphenylcyclohexyl | 2,6-diphenylcyclohexyl |

TABLE 1-continued

| combination | R1 | R3 | R4 |
| --- | --- | --- | --- |
| 16A | cyclohexyl-2-naphthyl | cyclohexyl-2-naphthyl | cyclohexyl-2-naphthyl |
| 17A | —H | cyclohexyl | cyclohexyl |
| 18A | —H | 2-methylcyclohexyl | 2-methylcyclohexyl |
| 19A | —H | 2-isopropylcyclohexyl | 2-isopropylcyclohexyl |
| 20A | —H | 2-phenylcyclohexyl | 2-phenylcyclohexyl |
| 21A | —H | 3-phenylcyclohexyl | 3-phenylcyclohexyl |
| 22A | —H | 4-phenylcyclohexyl | 4-phenylcyclohexyl |

TABLE 1-continued

| combination | R1 | R3 | R4 |
| --- | --- | --- | --- |
| 23A | —H | cyclopentyl | cyclopentyl |
| 24A | —H | cycloheptyl | cycloheptyl |
| 25A | —H | 2-ethylcyclohexyl | 2-ethylcyclohexyl |
| 26A | —H | 2-methoxycyclohexyl | 2-methoxycyclohexyl |
| 27A | —H | 2,6-dimethylcyclohexyl | 2,6-dimethylcyclohexyl |
| 28A | —H | 2,6-diisopropylcyclohexyl | 2,6-diisopropylcyclohexyl |
| 29A | —H | 2,6-di-tert-butylcyclohexyl | 2,6-di-tert-butylcyclohexyl |
| 30A | —H | 2,6-diphenylcyclohexyl | 2,6-diphenylcyclohexyl |

TABLE 1-continued
| combination | R1 | R3 | R4 |
|---|---|---|---|
| 31A | —H | 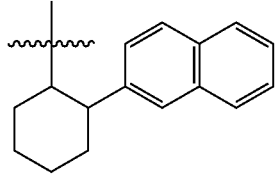 [SMILES: *C1CCCCC1c1ccc2ccccc2c1] | 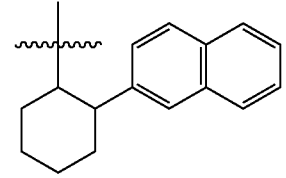 [SMILES: *C1CCCCC1c1ccc2ccccc2c1] |
| 32A | 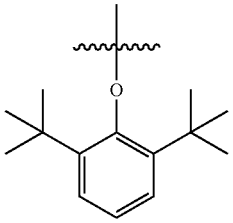 [SMILES: *Oc1c(C(C)(C)C)cccc1C(C)(C)C] | 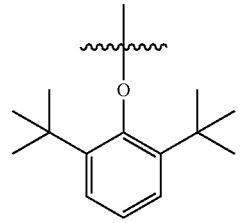 | 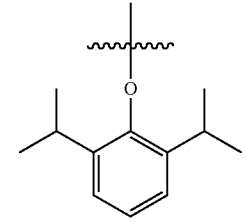 |
| 33A | —H | 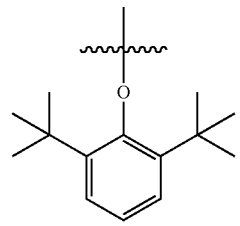 | 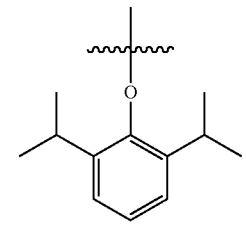 |
| 34A | 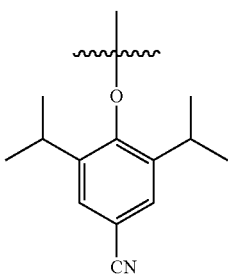 [SMILES: *Oc1c(C(C)C)cc(C#N)cc1C(C)C] | 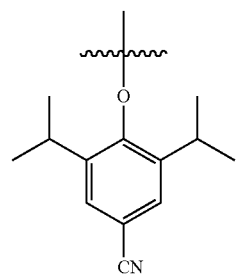 | 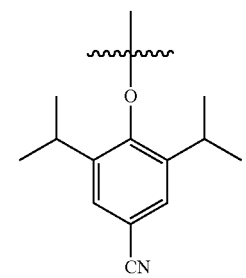 |
| 35A | —H | 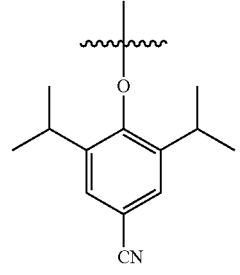 | 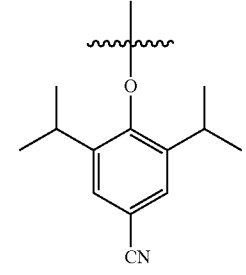 |
| 36A | 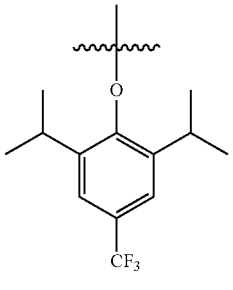 [SMILES: *Oc1c(C(C)C)cc(C(F)(F)F)cc1C(C)C] | 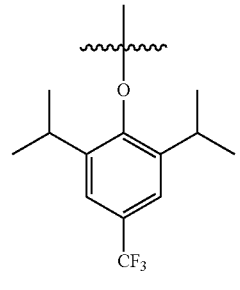 | 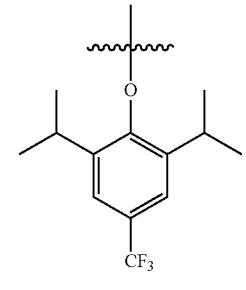 |

TABLE 1-continued

| combination | R1 | R3 | R4 |
|---|---|---|---|
| 37A | —H | 2,6-diisopropyl-4-(trifluoromethyl)phenoxy | 2,6-diisopropyl-4-(trifluoromethyl)phenoxy |
| 38A | 2,6-diphenylphenoxy | 2,6-diphenylphenoxy | 2,6-diphenylphenoxy |
| 39A | —H | 2,6-diphenylphenoxy | 2,6-diphenylphenoxy |
| 40A | 4-cyano-2,6-diphenylphenoxy | 4-cyano-2,6-diphenylphenoxy | 4-cyano-2,6-diphenylphenoxy |
| 41A | —H | 4-cyano-2,6-diphenylphenoxy | 4-cyano-2,6-diphenylphenoxy |
| 42A | 2,6-diphenyl-4-(trifluoromethyl)phenoxy | 2,6-diphenyl-4-(trifluoromethyl)phenoxy | 2,6-diphenyl-4-(trifluoromethyl)phenoxy |

TABLE 1-continued

| combination | R1 | R3 | R4 |
|---|---|---|---|
| 43A | —H | 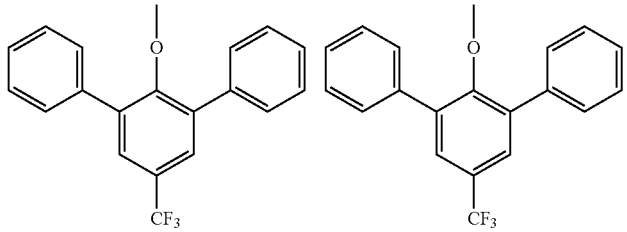 | 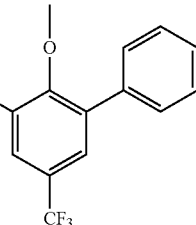 |

TABLE 2

| combination | R2 | R5 |
|---|---|---|
| 1B | —CN | —H |
| 2B | —COOC$_2$H$_5$ | —H |
| 3B | —CON(CH$_3$)$_2$ | —H |
| 4B | —CONH(C$_2$H$_5$) | —H |
| 5B | —CF$_3$ | —H |
| 6B | —SO$_3$C$_2$H$_5$ | —H |
| 7B | —NO$_2$ | —H |
| 8B | 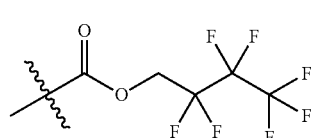 | —H |
| 9B | —H | —CN |
| 10B | —H | —COOC$_2$H$_5$ |
| 11B | —H | —CON(CH$_3$)$_2$ |
| 12B | —H | —CONH(C$_2$H$_5$) |
| 13B | —H | —CF$_3$ |
| 14B | —H | —SO$_3$C$_2$H$_5$ |
| 15B | —H | —NO$_2$ |
| 16B | —H | 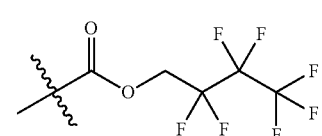 |
| 17B | —C$_6$H$_5$ | —CN |
| 18B | —CN | —CN |
| 19B | —COOC$_2$H$_5$ | —COOC$_2$H$_5$ |
| 20B | —CON(CH$_3$)$_2$ | —CON(CH$_3$)$_2$ |
| 21B | —CONH(C$_2$H$_5$) | —CONH(C$_2$H$_5$) |
| 22B | —CF$_3$ | —CF$_3$ |
| 23B | —SO$_3$C$_2$H$_5$ | —SO$_3$C$_2$H$_5$ |
| 24B | —NO$_2$ | —NO$_2$ |
| 25B | 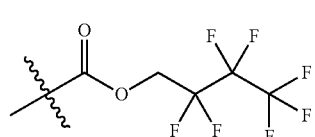 | 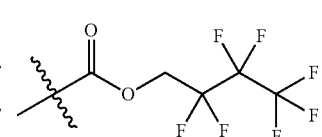 |
| 26B | —C$_6$H$_5$ | —C$_6$H$_5$ |
| 27B | —C$_6$H$_5$ | —H |
| 28B | —H | —C$_6$H$_5$ |

TABLE 3

| combination | X1 | X2 |
|---|---|---|
| 1C | —F | —F |
| 2C | —CN | —CN |
| 3C | —F | —CN |
| 4C | —NO$_2$ | —NO$_2$ |
| 5C | —CO$_2$CH$_3$ | —CO$_2$CH$_3$ |
| 6C | —OCOCH$_3$ | —OCOCH$_3$ |
| 7C | —CF$_3$ | —CF$_3$ |
| 8C | —SO$_3$C$_2$H$_5$ | —SO$_3$C$_2$H$_5$ |
| 9C | —OCH$_3$ | —OCH$_3$ |
| 10C | —OC$_6$H$_5$ | —OC$_6$H$_5$ |

In one embodiment of the present specification, the compound represented by Chemical Formula 1 has a maximum absorption peak at 480 nm to 590 nm.

In one embodiment of the present specification, the compound represented by Chemical Formula 1 has a maximum emission peak at 490 nm to 600 nm.

In one embodiment of the present specification, the maximum absorption peak and the maximum emission peak mean values obtained by measuring optical properties of a solution prepared in $10^{-5}$ [M] by dissolving the compound of the present specification in toluene using UV-vis and fluorescence.

One embodiment of the present specification provides a color conversion film including a resin matrix; and the compound represented by Chemical Formula 1 dispersed into the resin matrix.

The content of the compound represented by Chemical Formula 1 in the color conversion film may be in a range of 0.001% by weight to 10% by weight.

The color conversion film may include one type of the compound represented by Chemical Formula 1, or may include two or more types thereof.

The color conversion film may further include additional fluorescent substances in addition to the compound represented by Chemical Formula 1. When using a light source emitting blue light, the color conversion film preferably includes both a green light emitting fluorescent substance and a red light emitting fluorescent substance. In addition, when using a light source emitting blue light and green light, the color conversion film may only include a red light emitting fluorescent substance. However, the color conversion film is not limited thereto, and even when using a light source emitting blue light, the color conversion film may only include a red light emitting compound when a separate film including a green light emitting fluorescent substance is laminated. On the other hand, even when using a light source emitting blue light, the color conversion film may only include a green light emitting compound when a separate film including a red light emitting fluorescent substance is laminated.

The color conversion film may further include a resin matrix; and an additional layer including a compound dispersed into the resin matrix and emitting light in a wavelength different from the wavelength of the compound represented by Chemical Formula 1. The compound emitting light in a wavelength different from the wavelength of the compound represented by Chemical Formula 1 may also be the compound represented by Chemical Formula 1, or may be other known fluorescent substances.

The resin matrix material is preferably a thermoplastic polymer or a thermocurable polymer. Specifically, a poly(meth)acryl-based such as polymethyl methacrylate (PMMA), a polycarbonate (PC)-based, a polystyrene (PS)-based, a polyarylene (PAR)-based, a polyurethane (TPU)-based, a styrene-acrylonitrile (SAN)-based, a polyvinylidene fluoride (PVDF)-based, a modified polyvinylidene fluoride (modified-PVDF)-based and the like may be used as the resin matrix material.

According to one embodiment of the present specification, the color conversion film according to the embodiments described above additionally includes light diffusing particles. By dispersing light diffusing particles into the color conversion film instead of a light diffusing film used in the art for enhancing luminance, higher luminance may be exhibited compared to using a separate light diffusing film, and an adhering process may be skipped as well.

As the light diffusing particles, particles having a high refractive index with the resin matrix may be used, and examples thereof may include TiO$_2$, silica, borosilicate, alumina, sapphire, air or other gases, air- or gas-filled hollow beads or particles (for example, air/gas-filled glass or polymers); polystyrene, polycarbonate, polymethyl methacrylate, acryl, methyl methacrylate, styrene, melamine resin, formaldehyde resin, or polymer particles including melamine and formaldehyde resins, or any suitable combination thereof.

The light diffusing particles may have particle diameters in a range of 0.1 micrometers to 5 micrometers, for example, in a range of 0.3 micrometers to 1 micrometer. The content of the light diffusing particles may be determined as necessary, and for example, may be in a range of 1 part by weight to 30 parts by weight based on 100 parts by weight of the resin matrix.

The color conversion film according to the embodiments described above may have a thickness of 2 micrometers to 200 micrometers. Particularly, the color conversion film may exhibit high luminance even with a small thickness of 2 micrometers to 20 micrometers. This is due to the fact that the content of the fluorescent substance molecules included in the unit volume is higher compared to quantum dots.

The color conversion film according to the embodiments described above may have a substrate provided on one surface. This substrate may function as a support when preparing the color conversion film. Types of the substrate are not particularly limited, and the material or thickness is not limited as long as it is transparent and is capable of functioning as the support. Herein, being transparent means having visible light transmittance of 70% or higher. For example, a PET film may be used as the substrate.

The color conversion film described above may be prepared by coating a resin solution in which the compound represented by Chemical Formula 1 described above is dissolved on a substrate and drying the result, or by extruding and filming the compound represented by Chemical Formula 1 described above together with a resin.

The compound represented by Chemical Formula 1 is dissolved in the resin solution, and therefore, the compound represented by Chemical Formula 1 is uniformly distributed in the solution. This is different from a quantum dot film preparation process that requires a separate dispersion process.

As for the resin solution in which the compound represented by Chemical Formula 1 is dissolved, the preparation method is not particularly limited as long as the compound represented by Chemical Formula 1 and the resin described above are dissolved in the solution.

According to one example, the resin solution in which the compound represented by Chemical Formula 1 is dissolved may be prepared using a method of preparing a first solution by dissolving the compound represented by Chemical Formula 1 in a solvent, preparing a second solution by dissolving a resin in a solvent, and mixing the first solution and the second solution. When mixing the first solution and the second solution, it is preferable that these be uniformly mixed. However, the method is not limited thereto, and a method of simultaneously adding and dissolving the compound represented by Chemical Formula 1 and a resin in a solvent, a method of dissolving the compound represented by Chemical Formula 1 in a solvent and subsequently adding and dissolving a resin, a method of dissolving a resin in a solvent and then subsequently adding and dissolving the compound represented by Chemical Formula 1, and the like, may be used.

As the resin included in the solution, the resin matrix material described above, a monomer curable to this resin matrix resin, or a mixture thereof, may be used. For example, the monomer curable to the resin matrix resin includes a (meth)acryl-based monomer, and this may be formed to a resin matrix material by UV curing. When using such a curable monomer, an initiator required for curing may be further added as necessary.

The solvent is not particularly limited as long as it is capable of being removed by drying afterword while having no adverse effects on the coating process. Non-limiting examples of the solvent may include toluene, xylene, acetone, chloroform, various alcohol-based solvents, methylethyl ketone (MEK), methylisobutyl ketone (MIBK), ethyl acetate (EA), butyl acetate, dimethylformamide (DMF), dimethylacetamide (DMAc), dimethyl sulfoxide (DMSO), N-methyl-pyrrolidone (NMP) and the like, and one type or a mixture of two or more types may be used. When the first solution and the second solution are used, solvents included in each of the solutions may be the same as or different from each other. Even when different types of solvents are used in the first solution and the second solution, these solvents preferably have compatibility so as to be mixed with each other.

The process of coating the resin solution in which the compound represented by Chemical Formula 1 is dissolved on a substrate may use a roll-to-roll process. For example, a process of unwinding a substrate from a substrate-wound roll, coating the resin solution in which the compound represented by Chemical Formula 1 is dissolved on one surface of the substrate, drying the result, and then winding the result again on the roll may be used. When a roll-to-roll process is used, viscosity of the resin solution is preferably determined in a range capable of conducting the process, and for example, may be determined in a range of 200 cps to 2,000 cps.

As the coating method, various known methods may be used, and for example, a die coater may be used, or various bar coating methods such as a comma coater and a reverse comma coater may be used.

After the coating, a drying process is conducted. The drying process may be conducted under a condition required to remove a solvent. For example, a color conversion film including a fluorescent substance including the compound represented by Chemical Formula 1 having target thickness and concentration may be obtained on a substrate by carrying out the drying in an oven located close to a coater under a condition to sufficiently evaporate a solvent, in a direction of the substrate progressing during the coating process.

When a monomer curable to the resin matrix resin is used as the resin included in the solution, curing, for example, UV curing, may be conducted prior to or at the same time as the drying.

When the compound represented by Chemical Formula 1 is filmed by being extruded with a resin, extrusion methods known in the art may be used, and for example, the color conversion film may be prepared by extruding the compound represented by Chemical Formula 1 with a resin such as a polycarbonate (PC)-based, a poly(meth)acryl-based and a styrene-acrylonitrile (SAN)-based.

According to one embodiment of the present specification, the color conversion film may have a protective film or a barrier film provided on at least one surface. As the protective film or the barrier film, those known in the art may be used.

One embodiment of the present specification provides a backlight unit including the color conversion film described above. The backlight unit may have backlight unit constitutions known in the art except for including the color conversion film. FIG. 1 is a mimetic diagram of a backlight unit structure according to one embodiment. The backlight unit according to FIG. 1 includes a side chain-type light source (101), a reflecting plate (102) surrounding the light source, a light guide plate (103) either directly emitting light from the light source or inducing light reflected from the reflecting plate, a reflective layer (104) provided on one surface of the light guide plate, and a color conversion film (105) provided on a surface of the light guide plate opposite to a surface facing the reflecting plate. In FIG. 1, a light dispersion pattern of the light guide plate is expressed as (106). Light entering into the light guide plate has non-uniform light distribution due to the repetition of optical processes such as reflection, total-reflection, refraction and transmission, and in order to induce this non-uniform light distribution to uniform brightness, a two-dimensional light dispersion pattern may be used. However, the scope of the present disclosure is not limited to FIG. 1, and a direct type as well as a side chain type may be used as the light source, and the reflecting plate or the reflective layer may not be included or may be replaced with other constituents as necessary, and when necessary, additional films such as a light diffusing film, a light concentrating film and a luminance enhancing film may be further provided.

One embodiment of the present specification provides a display apparatus including the backlight unit. The display apparatus is not particularly limited as long as it includes the backlight unit, and may be included in TVs, computer monitors, laptops, mobile phones and the like.

Hereinafter, the present specification will be described in detail with reference to examples. However, the examples according to the present specification may be modified to various other forms, and the scope of the present specification is not to be construed as being limited to the examples described below. Examples of the present specification are provided in order to more fully describe the present specification to those having average knowledge in the art.

Comparative Example

[Compound A]

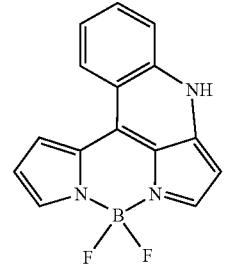

<Preparation of A-1>

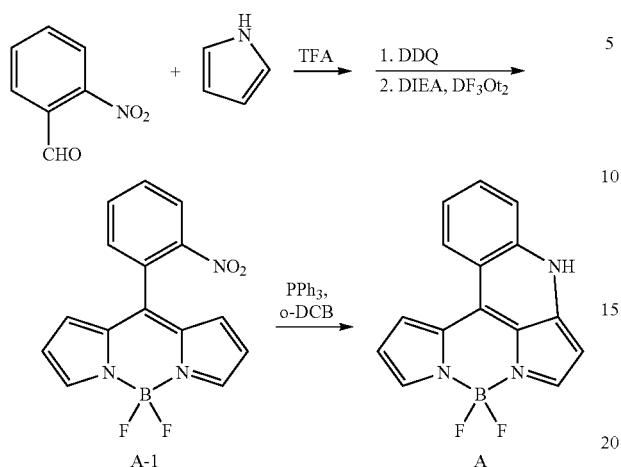

After dissolving pyrrole (2 g, 23.8 mmol) in dichloromethane, 2-nitrobenzaldehyde (1.2 g, 11.9 mmol) was added thereto, and after stirring the result for approximately 15 minutes, 1 to 2 drops of trifluoroacetic acid was added thereto, and the result was stirred for 12 hours at room temperature. After that, 2,3-dichloro-5,6-dicyano-p-benzoquinone (2.7 g, 11.9 mmol) was added thereto, and the result was further stirred for 15 minutes. To the stirred mixture, N,N-diisopropylethylamine (DIEA) (21.5 g, 166 mmol) was added, and then boron trifluoride-ethyl ether complex (25 g, 178 mmol) was slowly added thereto, and the result was further stirred for 5 hours. After completing the stirring, the reaction was terminated with water, and the organic layer was extracted using dichloromethane. The extracted material was concentrated and, using column chromatography, Intermediate A-1 was synthesized.

<Preparation of Compound A>

Intermediate A-1 (1 eq.), triphenylphosphine (5 eq.) and o-dichlorobenzene (5 mL) were stirred for 24 hours at 150° C. After completing the stirring, the reaction was terminated, and Compound A was separated through a column.

1H NMR (400 MHz, CDCl3) δ:10.53 (s, 1H), 8.54 (d, J=8.6 Hz, 1H), 7.95 (d, 1H), 7.68 (s, 1H), 7.64-7.59 (m, 1H), 7.51-7.43 (m, 2H), 7.38 (d, 1H), 6.61-6.52 (m, 1H), 6.22 (d, 1H)

Method for Preparing Film Using [Compound A]

The prepared [Compound A] was used in preparing a green light emitting color conversion film. Specifically, a green light emitting material [Compound A] was added in a ratio of 0.5% by weight with respect to 100% by weight of a SAN polymer, and after introducing 3% by weight of diffuser particles thereto, a solution having an approximately 30% solid content in a dimethylformamide (DMF) solvent was coated on a PET film to prepare a green light emitting color conversion film. With the prepared green conversion film, a 160 mm×90 mm backlight unit was prepared using a blue LED light source. Optical properties were identified in the prepared backlight unit, and an emission spectrum of the prepared color conversion film was measured using a spectroradiometer (SR series of TOPCON Technohouse Corporation).

Example 1

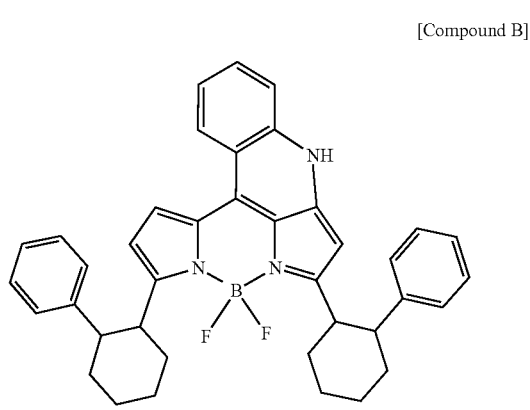

Preparation Example

<Preparation of Compound B>

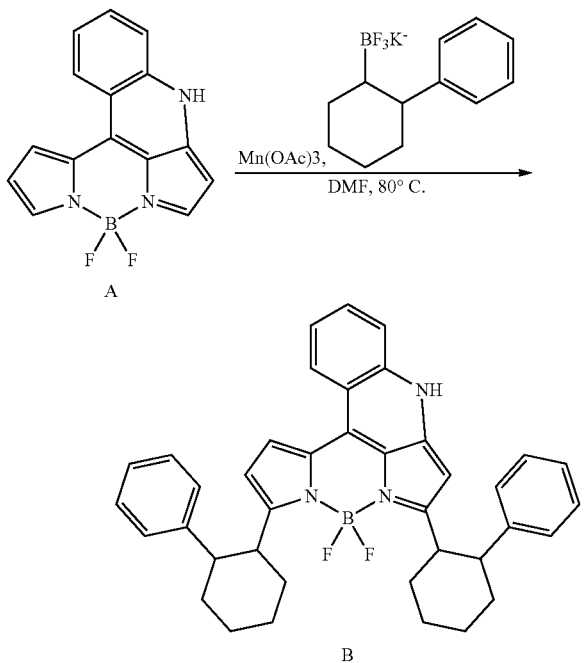

After dissolving Compound A (1.6 mmol) in dimethylformamide (DMF), Mn(OAc)3 (8 mmol) and potassium 2-phenylcyclohexyltrifluoroborate (3.2 mmol) were added thereto, and after stirring the result for 5 hours at 80° C., the reaction was terminated. The organic layer was extracted using water and ethyl acetate, the extracted material was concentrated, and, using column chromatography, [Compound B] was secured.

¹H NMR (400 MHz, DMSO) δ: 11.7 (s, 1H), 8.35 (d, J=2.0 Hz, 1H), 8.10 (d J=1.5 Hz, 1H), 7.90-7.52 (m, 9H), 7.44-7.38 (m, 4H), 7.38 (d, 2.1 Hz 1H), 6.61-6.52 (m, 1H), 6.22 (d, 1H), 3.15-3.13 (m, 2H), 2.73-2.68 (m, 2H), 1.42-1.39 (m, 4H), 1.20-1.00 (m, 12H)

Method for Preparing Film Using [Compound B]

The prepared [Compound B] was used in preparing a green light emitting color conversion film. Specifically, a green light emitting material [Compound B] was added in 0.5% by weight with respect to 100% by weight of a SAN polymer, and after introducing 3% by weight of diffuser particles thereto, a solution having an approximately 30% solid content in a dimethylformamide (DMF) solvent was coated on a PET film to prepare a green light emitting color conversion film. With the prepared green conversion film, a 160 mm×90 mm backlight unit was prepared using a blue LED light source. Optical properties were identified in the prepared backlight unit, and an emission spectrum of the prepared color conversion film was measured using a spectroradiometer (SR series of TOPCON Technohouse Corporation).

Example 2

[Compound C]

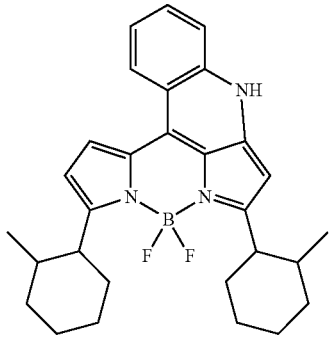

<Preparation of Compound C>

Preparation was conducted in the same manner as in the method for preparing Compound B, except that potassium 2-methylcyclohexyltrifluoroborate was used instead of potassium 2-phenylcyclohexyltrifluoroborate.

1H NMR (400 MHz, DMSO) δ: 8.2 (d, d, J=2.0 Hz, 1H), 7.85 (d, J=2.0 Hz, 1H), 7.30-7.03 (m, 3H), 6.62 (bs, 1H), 6.22 (s, 1H), 5.98 (s, 1H) 2.62 (m, 2H), 2.16-1.50 (m, 18H), 0.90-0.85 (m, 6H)

Method for Preparing Film Using [Compound C]

The prepared [Compound C] was used in preparing a green light emitting color conversion film. Specifically, a green light emitting material [Compound C] was added in a ratio of 0.5% by weight with respect to 100% by weight of a SAN polymer, and after introducing 3% by weight of diffuser particles thereto, a solution having an approximately 30% solid content in a dimethylformamide (DMF) solvent was coated on a PET film to prepare a green light emitting color conversion film. With the prepared green conversion film, a 160 mm×90 mm backlight unit was prepared using a blue LED light source. Optical properties were identified in the prepared backlight unit, and an emission spectrum of the prepared color conversion film was measured using a spectroradiometer (SR series of TOPCON Technohouse Corporation).

A maximum emission peak of each of the backlight units prepared in Comparative Example, Examples 1 and 2 was measured, and the results are shown in the following Table 4.

TABLE 4

| Film | Comparative Example | Example 1 | Example 2 |
|---|---|---|---|
| Wavelength for Maximum Emission Peak [nm] | 490 | 510 | 502 |

<Method of Measuring Light Resistance>

A 160 mm×90 mm backlight unit was prepared using a blue LED light source. Optical properties of the prepared green conversion film were identified in the prepared backlight unit, and this prepared backlight unit was continuously driven in a chamber at a temperature of 60° C. to evaluate light resistance of the light emitting film.

TABLE 5

| | % Green Intensity (% with respect to Initial Value) | | |
|---|---|---|---|
| Film | Comparative Example | Example 1 | Example 2 |
| 100 hr | 75% | 90% | 82% |

Through Tables 4 and 5, it was seen that Compounds B and C having substituents bonding to the positions of R3 and R4 were able to prepare a green light emitting film in a short wavelength region, and had enhanced driving durability.

Specifically, Compound A of Comparative Example corresponds to a compound in which R3 and R4 are hydrogen, and it was identified that Compound A had reduced light resistance compared to the compounds of Example 1 and 2 in which R3 and R4 are a cycloalkyl group substituted with an alkyl group or an aryl group.

In addition, it was identified that Compound B in which R3 and R4 are a cycloalkyl group substituted with an aryl group had higher light resistance compared to Compound C in which R3 and R4 are a cycloalkyl group substituted with an alkyl group.

The invention claimed is:

1. A compound represented by the following Chemical Formula 1:

[Chemical Formula 1]

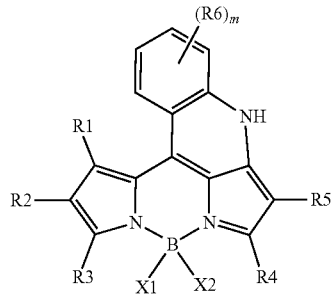

wherein, in Chemical Formula 1,

R1, R2, R5 and R6 are the same as or different from each other, and each independently hydrogen; deuterium; a cyano group; a nitro group; an imide group; an amide group; a carbonyl group; an ester group; a substituted or unsubstituted fluoroalkyl group; a substituted or unsubstituted sulfonyl group; a substituted or unsubstituted sulfonamide group; a substituted or unsubstituted alkyl group; a substituted or unsubstituted cycloalkyl group; a substituted or unsubstituted alkoxy group; a substituted or unsubstituted aryloxy group; a substituted or unsubstituted aryl group; or a substituted or unsubstituted heteroaryl group;

m is an integer of 0 to 4, and when m is 2 or greater, R6s are the same as or different from each other;

R3 and R4 are the same as or different from each other, and each independently a substituted or unsubstituted cycloalkyl group; or a substituted or unsubstituted aryloxy group;

X1 and X2 are the same as or different from each other, and each independently a halogen group; a cyano group; a nitro group; an imide group; an amide group; a carbonyl group; an ester group; a substituted or unsubstituted fluoroalkyl group; a substituted or unsubstituted sulfonyl group; a substituted or unsubstituted sulfonamide group; a substituted or unsubstituted alkoxy group; a substituted or unsubstituted aryloxy group; or a substituted or unsubstituted aryl group, or X1 and X2 bond to each other to form a substituted or unsubstituted ring.

2. The compound of claim 1, wherein R3 and R4 are the same as or different from each other, and each independently a cyclohexyl group unsubstituted or substituted with an alkyl group, an aryl group or an alkoxy group; or a phenoxy group unsubstituted or substituted with an alkyl group, a cyano group, a fluoroalkyl group or an aryl group.

3. The compound of claim 1, wherein R3 and R4 are the same as or different from each other, and each independently a cycloalkyl group unsubstituted or substituted with an aryl group.

4. The compound of claim 1, wherein R1 is hydrogen; deuterium; a substituted or unsubstituted alkyl group; a substituted or unsubstituted cycloalkyl group; a substituted or unsubstituted alkoxy group; a substituted or unsubstituted aryloxy group; a substituted or unsubstituted aryl group; or a substituted or unsubstituted heteroaryl group.

5. The compound of claim 1, wherein R2 and R5 are the same as or different from each other, and each independently hydrogen; deuterium; a cyano group; a nitro group; an imide group; an amide group; a carbonyl group; an ester group; a substituted or unsubstituted fluoroalkyl group; a substituted or unsubstituted sulfonyl group; or a substituted or unsubstituted sulfonamide group.

6. The compound of claim 1, wherein X1 and X2 are the same as or different from each other, and each independently a halogen group, a cyano group, a substituted or unsubstituted alkoxy group, or a substituted or unsubstituted aryloxy group.

7. The compound of claim 1, wherein R1, R3 and R4 are selected from the following Table 1, R2 and R5 are selected from the following Table 2, R6 is hydrogen, and X1 and X2 are selected from the following Table 3:

TABLE 1

| combination | R1 | R3 | R4 |
|---|---|---|---|
| 1A | | | |
| 2A | | | |
| 3A | | | |
| 4A | | | |
| 5A | | | |

TABLE 1-continued
| combination | R1 | R3 | R4 |
|---|---|---|---|
| 6A | 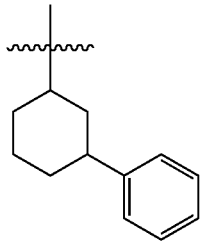 [SMILES: *C1CCCC(c2ccccc2)C1] | 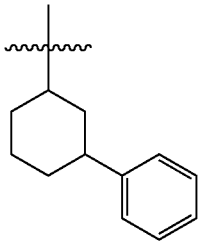 | 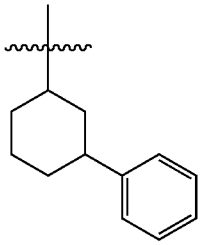 |
| 7A | 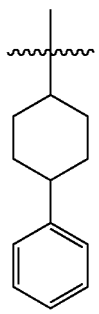 | 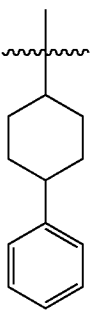 | 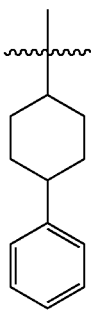 |
| 8A | 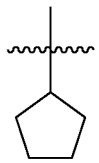 | 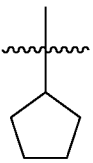 [SMILES: *C1CCCC1] | 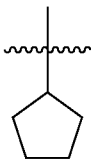 |
| 9A | 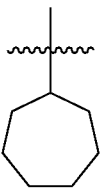 [SMILES: *C1CCCCCC1] | 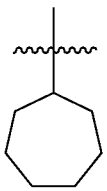 [SMILES: *C1CCCCCC1] | 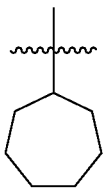 |
| 10A | 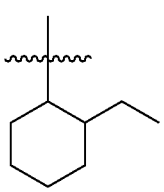 [SMILES: *C1CCCCC1CC] | 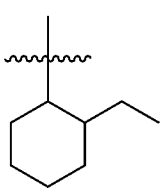 [SMILES: *C1CCCCC1CC] | 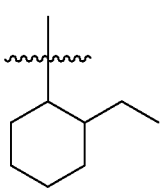 |
| 11A | 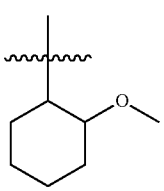 [SMILES: *C1CCCCC1OC] | 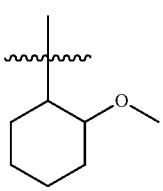 [SMILES: *C1CCCCC1OC] | 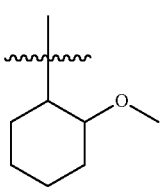 |
| 12A | 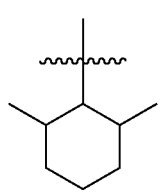 | 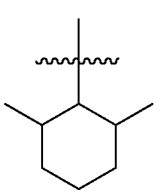 | 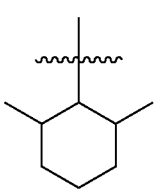 |

TABLE 1-continued

| combination | R1 | R3 | R4 |
|---|---|---|---|
| 13A | 2,6-diisopropylcyclohexyl | 2,6-diisopropylcyclohexyl | 2,6-diisopropylcyclohexyl |
| 14A | 2,6-di-tert-butylcyclohexyl | 2,6-di-tert-butylcyclohexyl | 2,6-di-tert-butylcyclohexyl |
| 15A | 2,6-diphenylcyclohexyl | 2,6-diphenylcyclohexyl | 2,6-diphenylcyclohexyl |
| 16A | 2-(naphthalen-2-yl)cyclohexyl | 2-(naphthalen-2-yl)cyclohexyl | 2,6-diphenylcyclohexyl |
| 17A | —H | cyclohexyl | cyclohexyl |
| 18A | —H | 2-methylcyclohexyl | 2-methylcyclohexyl |
| 19A | —H | 2-isopropylcyclohexyl | 2-isopropylcyclohexyl |
| 20A | —H | 2-phenylcyclohexyl | 2-phenylcyclohexyl |

TABLE 1-continued
| combination | R1 | R3 | R4 |
|---|---|---|---|
| 21A | —H | 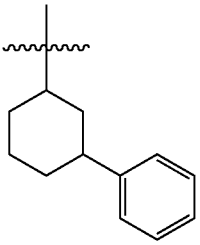 | 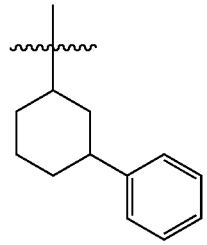 |
| 22A | —H | 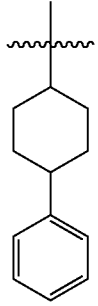 | 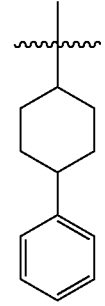 |
| 23A | —H | 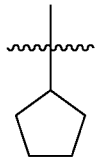 [SMILES: *C1CCCC1] | 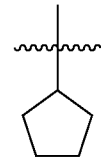 |
| 24A | —H | 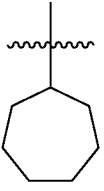 [SMILES: *C1CCCCCC1] | 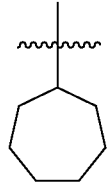 |
| 25A | —H | 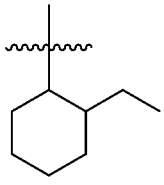 | 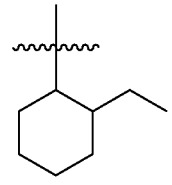 |
| 26A | —H | 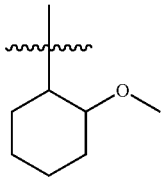 | 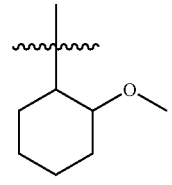 |
| 27A | —H | 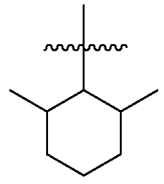 | 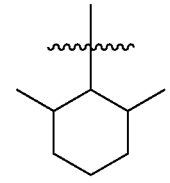 |

TABLE 1-continued
| combination | R1 | R3 | R4 |
|---|---|---|---|
| 28A | —H | 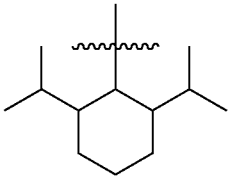 [SMILES: *C1C(C(C)C)CCCC1C(C)C] | 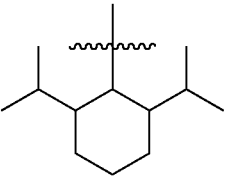 [SMILES: *C1C(C(C)C)CCCC1C(C)C] |
| 29A | —H | 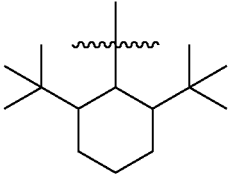 [SMILES: *C1C(C(C)(C)C)CCCC1C(C)(C)C] | 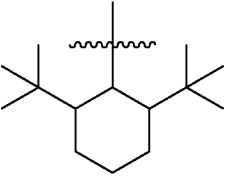 [SMILES: *C1C(C(C)(C)C)CCCC1C(C)(C)C] |
| 30A | —H | 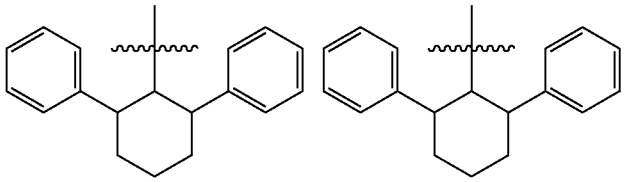 | 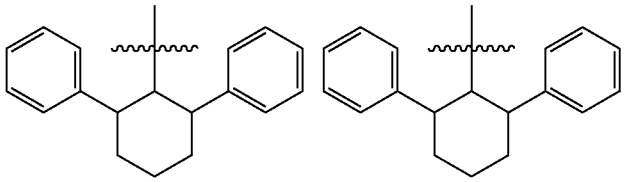 |
| 31A | —H | 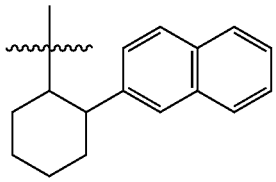 [SMILES: *C1CCCCC1c1ccc2ccccc2c1] | 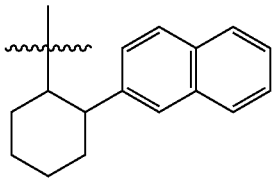 [SMILES: *C1CCCCC1c1ccc2ccccc2c1] |
| 32A | 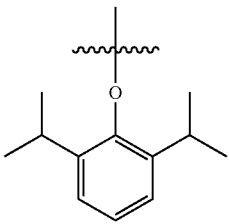 [SMILES: *Oc1c(C(C)C)cccc1C(C)C] | 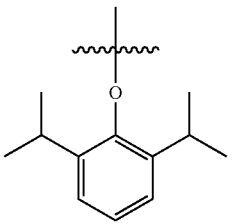 | 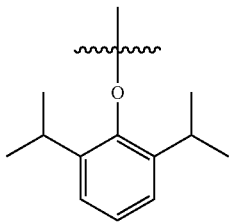 |
| 33A | —H | 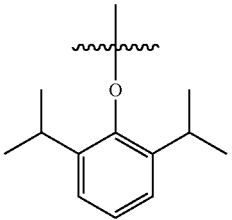 | 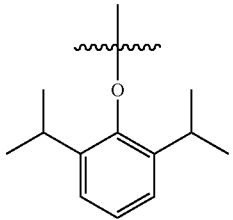 |
| 34A | 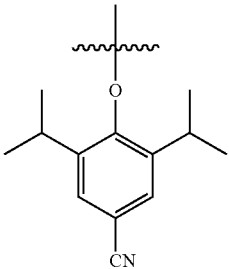 [SMILES: *Oc1c(C(C)C)cc(C#N)cc1C(C)C] | 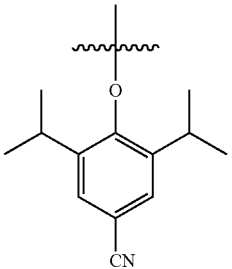 | 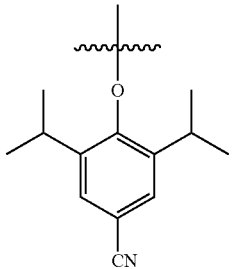 |

TABLE 1-continued
| combination | R1 | R3 | R4 |
|---|---|---|---|
| 35A | —H | 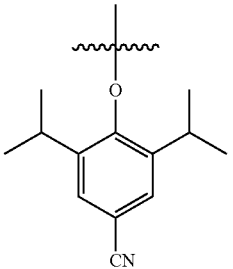 | 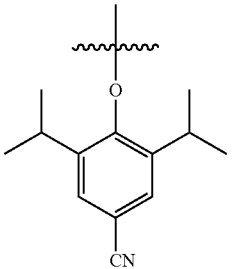 |
| 36A | 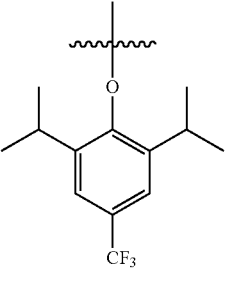 [SMILES: *Oc1c(C(C)C)cc(C(F)(F)F)cc1C(C)C] | 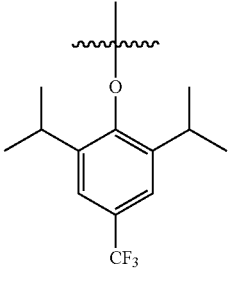 | 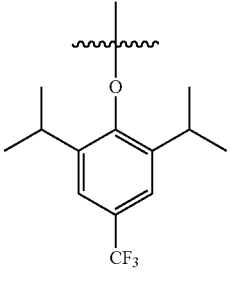 |
| 37A | —H | 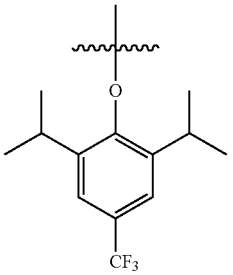 | 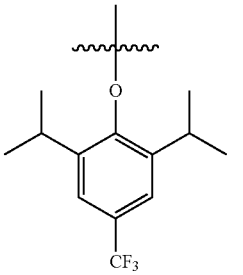 |
| 38A | 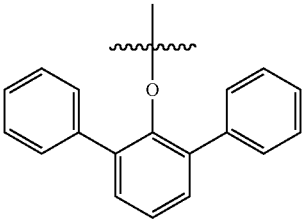 [SMILES: *Oc1c(-c2ccccc2)cccc1-c1ccccc1] | 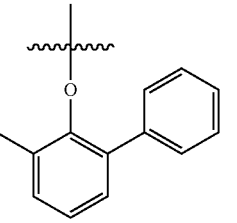 | 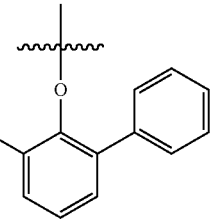 |
| 39A | —H | 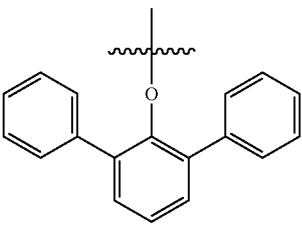 [SMILES: *Oc1c(-c2ccccc2)cccc1-c1ccccc1] | 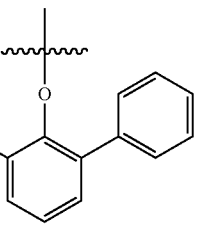 |
| 40A | 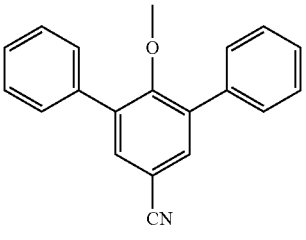 | 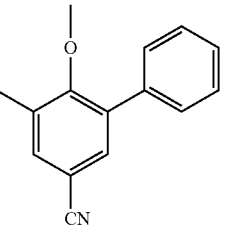 | 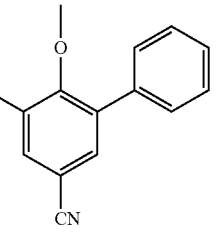 |

TABLE 1-continued

| combination | R1 | R3 | R4 |
|---|---|---|---|
| 41A | —H | [structure: 2,6-diphenyl-4-cyanophenyl methoxy] | [structure: 2,6-diphenyl-4-cyanophenyl methoxy] |
| 42A | [structure: 2,6-diphenyl-4-CF₃-phenyl methoxy] | [structure: 2,6-diphenyl-4-CF₃-phenyl methoxy] | [structure: 2,6-diphenyl-4-CF₃-phenyl methoxy] |
| 43A | —H | [structure: 2,6-diphenyl-4-CF₃-phenyl methoxy] | [structure: 2,6-diphenyl-4-CF₃-phenyl methoxy] |

TABLE 2

| combination | R2 | R5 |
|---|---|---|
| 1B | —CN | —H |
| 2B | —COOC$_2$H$_5$ | —H |
| 3B | —CON(CH$_3$)$_2$ | —H |
| 4B | —CONH(C$_2$H$_5$) | —H |
| 5B | —CF$_3$ | —H |
| 6B | —SO$_3$C$_2$H$_5$ | —H |
| 7B | —NO$_2$ | —H |
| 8B | [structure: —C(CH$_3$)(—)C(=O)O-CH$_2$-CF$_2$-CF$_2$-CF$_3$ perfluorinated ester] | —H |
| 9B | —H | —CN |
| 10B | —H | —COOC$_2$H$_5$ |
| 11B | —H | —CON(CH$_3$)$_2$ |
| 12B | —H | —CONH(C$_2$H$_5$) |
| 13B | —H | —CF$_3$ |
| 14B | —H | —SO$_3$C$_2$H$_5$ |
| 15B | —H | —NO$_2$ |
| 16B | —H | [structure: —C(CH$_3$)(—)C(=O)O-CH$_2$-CF$_2$-CF$_2$-CF$_3$ perfluorinated ester] |
| 17B | —C$_6$H$_5$ | —CN |
| 18B | —CN | —CN |
| 19B | —COOC$_2$H$_5$ | —COOC$_2$H$_5$ |

TABLE 2-continued

| combination | R2 | R5 |
|---|---|---|
| 20B | —CON(CH$_3$)$_2$ | —CON(CH$_3$)$_2$ |
| 21B | —CONH(C$_2$H$_5$) | —CONH(C$_2$H$_5$) |
| 22B | —CF$_3$ | —CF$_3$ |
| 23B | —SO$_3$C$_2$H$_5$ | —SO$_3$C$_2$H$_5$ |
| 24B | —NO$_2$ | —NO$_2$ |
| 25B | —C(=O)OCH$_2$C(F)$_2$C(F)$_2$CF$_3$ (perfluorobutyl ester) | —C(=O)OCH$_2$C(F)$_2$C(F)$_2$CF$_3$ (perfluorobutyl ester) |
| 26B | —C$_6$H$_5$ | —C$_6$H$_5$ |
| 27B | —C$_6$H$_5$ | —H |
| 28B | —H | —C$_6$H$_5$ |

TABLE 3

| combination | X1 | X2 |
|---|---|---|
| 1C | —F | —F |
| 2C | —CN | —CN |
| 3C | —F | —CN |
| 4C | —NO$_2$ | —NO$_2$ |
| 5C | —CO$_2$CH$_3$ | —CO$_2$CH$_3$ |
| 6C | —OCOCH$_3$ | —OCOCH$_3$ |
| 7C | —CF$_3$ | —CF$_3$ |
| 8C | —SO$_3$C$_2$H$_5$ | —SO$_3$C$_2$H$_5$ |
| 9C | —OCH$_3$ | —OCH$_3$ |
| 10C | —OC$_6$H$_5$ | —OC$_6$H$_5$ |

8. The compound of claim 1, wherein the compound represented by Chemical Formula 1 has a maximum absorption peak at 480 nm to 590 nm.

9. The compound of claim 1, wherein the compound represented by Chemical Formula 1 has a maximum emission peak at 490 nm to 600 nm.

10. A color conversion film comprising:
   a resin matrix; and
   at least one compound represented by Chemical Formula 1 of claim 1 dispersed into the resin matrix.

11. A backlight unit comprising the color conversion film of claim 10.

12. A display apparatus comprising the backlight unit of claim 11.

13. The color conversion film of claim 10, wherein the resin matrix is a thermoplastic polymer or a thermocurable polymer.

14. A color conversion film, comprising:
   a resin matrix; and
   at least one compound represented by Chemical Formula 1 of claim 2 dispersed into the resin matrix.

15. A color conversion film, comprising:
   a resin matrix; and
   at least one compound represented by Chemical Formula 1 of claim 3 dispersed into the resin matrix.

16. A color conversion film, comprising:
   a resin matrix; and
   at least one compound represented by Chemical Formula 1 of claim 7 dispersed into the resin matrix.

* * * * *